United States Patent Office 2,855,342
Patented Oct. 7, 1958

2,855,342

ANALGESIC COMPOSITIONS

Kuno Wagner, Leverkusen, Germany, and Werner Grab, Wuppertal-Elberfeld, Germany, assignors to Schenley Industries, Inc., New York, N. Y., a corporation of Delaware No Drawing. Application July 23, 1956
Serial No. 599,293

Claims priority, application Germany July 27, 1955

8 Claims. (Cl. 167—65)

This invention relates, generally, to novel chemical compositions useful in chemotherapy and, more particularly, it is concerned with certain new, stable, aqueous solutions having dissolved therein relatively high concentrations of water-insoluble or merely sparingly water-soluble therapeutically effective substances. These new solutions, because of the relatively high concentration of therapeutically effective substance present per unit volume of solution, are especially suitable for use in parenteral administration of water-insoluble or merely sparingly water-soluble therapeutically effective substances.

It is known that certain antipyretics and analgesics commonly used in treatment of arthritis and the like, such as the pyrazolone compound aminopyrine (4-dimethyl-amino-1,5-dimethyl-5-phenyl-3-pyrazolone), which now has largely replaced antipyrine (1,5-dimethyl-5-phenyl-3-pyrazolone) for this use, are but sparingly soluble in water and, for this reason, present problems when used by parenteral administration in the treatment of chronic cases.

It has been suggested to produce solutions of aminopyrine suitable for parenteral administration by dissolving the substance in aqueous solutions of a sodium derivative of an enolizable 3,5-pyrazolidinedione, such as butazolidine (1,2-diphenyl-4-butyl-3,5-pyrazolidinedione sodium) which also possesses analgesic properties making it useful in treatment of arthritis and the like. However, it is found that such solutions, although containing a relatively high concentration of aminopyrine, have the common disadvantage, due to their being nonisotonic, of producing a strong and undesirable osmotic action upon administration, presumably attributable to dissociation of the alkaline-reacting enol salts in aqueous solutions, which render such solutions unsatisfactory for parenteral administration.

It is now found, pursuant to this invention and surprisingly in view of the non-isotonicity of the butazolidine-aminopyrine solutions above-described, that stable, isotonic, aqueous solutions containing a high concentration of aminopyrine can be produced by incorporating in the solution as a solubilizing agent a non-alkaline-reacting derivative of a 3,5-pyrazolidinedione-2-carboxylic acid, especially one of the lower alkyl esters, lower dialkylamides, or anilides of such acids. The esters of these carboxylic acids may be prepared in the manner described in the copending patent application of Kuno Wagner, Erwin Müller, Otto Bayer and Werner Grab, Serial Number 549,547, now Patent No. 2,790,807, filed November 28, 1955, and entitled: Novel Chemical Compounds; the anilides and dialkylamides of said carboxylic acids may be prepared in the manner described in the copending patent application of Kuno Wagner, Erwin Müller, Otto Bayer and Werner Grab, Serial Number 557,443, filed January 5, 1956, now Patent No. 2,790,808, entitled: Novel Chemical Compounds.

Specifically, the non-alkaline-reacting derivatives of 3,5-pyrazolidinedione-2-carboxylic acids that may be utilized in preparing the novel, isotonic aqueous solutions in accordance with this invention containing per unit volume an amount of dissolved aminopyrine that materially exceeds the amount of aminopyrine soluble in an equal unit volume of water are the following substances: 1,4-diphenyl-3,5-pyrazolidinedione-2-carboxylic acid dimethylamide, the ethyl ester of 1-phenyl-3,5-pyrazolidinedione-2-carboxylic acid, 2-ethoxycarbonyl-4-phenyl-3,5-pyrazolidinedione, 1 - phenyl - 2 - phenylcarbamyl - 3 - oxo-pyrazolidine-5-phenylcarbamic acid ester, and 1-phenyl-2 - phenyl - carbamyl - 5 - oxopyrazolidine - 3 - phenylcarbamic acid ester.

The novel isotonic parenterally administrable aqueous solutions embodying the principles of this invention may be prepared readily by suspending the substance to be solubilized in hot water, then adding thereto the selected 3,5-pyrazolidinedione-2-carboxylic acid derivative. Thus, for example, it is possible by utilizing the substantially water-insoluble, 1,4-diphenyl-3,5-pyrazolidinedione-2-carboxylic acid dimethylamide as the solubilizing agent, to prepare stable isotonic aqueous solutions containing 38% by weight, or even more, of aminopyrine and such solutions, if desired, may be diluted with water in any proportion without precipitation of either of the mentioned solutes.

Further pursuant to this invention, it is found that the above described solutions are capable of dissolving other sparsely water-soluble pharmaceutical agents; for instance, quinine, purine derivatives such as caffeine, antibiotics such as chloramphenicol, salicylic acid esters such as acetylsalicylic acid, antimalarials such as quinacrine [3-chloro- 7 - methoxy - 9 - (1 - methyl - 4 - diethylamino-butylamino)acridine] and pamaquine [6 - methoxy - 8- (1-methyl-4-diethylamino)butylaminoquinoline].

The novel solutions above described are compatible with water-soluble pharmaceuticals, for instance, with antipyrine (1,5-dimethyl-2-phenyl-3-pyrazolone), and with aqueous solutions thereof, thus facilitating preparation of a variety of combinations of therapeutically useful agents for pharmaceutical use.

To facilitate a fuller and more complete understanding of how the principles of this invention best may be applied, certain specific examples herewith follow wherein the preparation of typical solutions is described. It is clearly to be understood, however, that these examples are provided by way of illustration, merely, and that they are not to be construed as imposing any limitations upon the invention as defined in the subjoined claims.

*Example One*

About 20 parts by weight of aminopyrine is mixed with an equal weight of hot water and the mixture is briefly heated and agitated to produce a turbid suspension. To this mixture at a temperature of approximately 60° to 70° C., 20 parts by weight of 1,4-diphenyl-3,5-pyrazolidinedione-2-carboxylic acid dimethylamide is added portionwise with stirring. As the voluminous mass of felted needles is added to the suspension, it quickly clears as the suspended material passes into clear solution and the solution so obtained shows no tendency to crystallize solute even when cooled or after prolonged standing. The concentration of the aminopyrine and of the solubilizer in the resulting solution is 33.4% by weight each; total solute concentration, 66.8% by weight; 77.4 grams total solute concentration per hundred cubic centimeters of solution.

By using 66.7 parts by weight of water instead of 20 parts by weight of water in the above formulation, a stable, more dilute solution is obtained wherein the concentration of the two solutes is 18.7% by weight each and their total concentration is 37.4% by weight. Likewise, by using 133.3 parts by weight of water instead of 20 parts, the solutes will be present in the resulting solution in a concentration of 11.5% by weight each.

The highly concentrated solution according to the formulation first set forth above may, if desired, be diluted with water to reduce the solute concentration to any desired lower levels and such dilution will not result in precipitation or separation of either of the solutes. If desired, this solution may be used as a vehicle for administration, too, of caffeine; 10% to 12% by weight of this substance may be dissolved therein without adversely affecting the properties of the solution as above set forth.

*Example Two*

About 10 parts by weight of aminopyrine is suspended in 34 parts by weight of hot water in the manner described in the foregoing example, then 10 parts by weight of the ethyl ester of 1-phenyl-3,5-pyrazolidinedione-2-carboxylic acid is added to the hot suspension. The resulting stable, clear solution contains 18.5% by weight of each of the solutes and no separation of either solute results if the solution is cooled, permitted to stand, or is diluted with water.

*Example Three*

Using about 8.3 parts by weight of aminopyrine, 8.3 parts by weight of antipyrine, 24 parts by weight of hot water, and 8.3 parts by weight of finely pulverized 2-ethoxycarbonyl-4-phenyl-3,5-pyrazolidinedione, a clear solution is prepared as is described in Example 1. The solution thereby obtained contains 16.98% by weight of each of the three solutes and its properties are similar to those of the solutions above described.

*Example Four*

A stable, clear aqueous solution of aminopyrine and 1,4-diphenyl-3,5-pyrazolidinedione-2-carboxylic acid dimethylamide is prepared as described in Example 1 and to this solution a finely divided mixture of equal parts by weight of aminopyrine and quinine is added until the resulting clear, stable solution contains 4% to 5% by weight of quinine. This solution, which has the properties of the solutions above described, contains quinine in a concentration about a hundred-fold the solubility of quinine in water.

*Example Five*

A stable, clear aqueous solution of aminopyrine and 1,4-diphenyl-3,5-pyrazolidinedione-2 carboxylic acid dimethylamide is prepared as described in Example 1 and to this solution a finely divided mixture of equal parts of aminopyrine and acetylsalicylic acid is added until the resulting clear, stable solution contains 10% to 11% by weight of acetylsalicylic acid. If chloramphenicol is substituted for the acetylsalicylic acid in the foregoing formulation, a clear, stable aqueous solution may be obtained containing 6% to 8% by weight of chloramphenicol. These solutions remain clear without separation of solute upon cooling, standing, or dilution with water.

*Example Six*

A clear, stable aqueous solution is prepared as described in Example 1 using 10 parts by weight of aminopyrine, 20 parts by weight of antipyrine, and 20 parts by weight of hot water having dissolved therein 4.1 parts by weight of 1-phenyl-2-phenylcarbamyl-3(or 5)-oxopyrazolidine-5(or 3)-phenylcarbamic acid ester. This solution contains 18.5% by weight of aminopyrine, 37% by weight of antipyrine, and 7.5% by weight of the solubilizing agent, 1-phenyl-2-phenylcarbamyl-3(or 5)-oxopyrazolidine-5(or 3)-phenylcarbamic acid ester.

This solubilizing agent may be prepared by reaction of phenyl isocyanate with the enol form of 1-phenyl-2-phenylcarbamyl-3,5-pyrazolidinedione according to the procedure usual for making phenylcarbamic acid esters by reaction of phenyl isocyanate with an alcohol.

The otherwise stable and clear aqueous solution obtained as described in this example develops some turbidity when diluted with water.

Each of the solutions prepared as above described is suitable for parenteral administration and when so administered produces no undesirable osmotic reactions due to nonisotonicity.

Having thus described the subject matter of this invention, what is desired to secure by Letters Patent is:

1. A clear, stable, isotonic, parenterally administrable aqueous solution that comprises a non-alkaline reacting solubilizing agent selected from the group consisting of the lower alkyl esters, lower dialkylamides, and anilides of 3,5-pyrazolidinedione-2-carboxylic acids; and containing aminopyrine in an amount per unit volume materially exceeding the amount of aminopyrine soluble in an equal unit volume of water.

2. A product as defined by claim 1 wherein the non-alkaline reacting solubilizing agent is a lower alkyl ester of a 3,5-pyrazolidinedione-2-carboxylic acid.

3. A product as defined by claim 1 wherein the non-alkaline reacting solubilizing agent is the ethyl ester of 1-phenyl-3,5-pyrazolidinedione-2-carboxylic acid.

4. A product as defined by claim 1 wherein the non-alkaline reacting solubilizing agent is the ethyl ester of 4-phenyl-3,5-pyrazolidinedione-2-carboxylic acid.

5. A product as defined by claim 1 wherein the non-alkaline reacting solubilizing agent is a lower dialkylamide of a 3,5-pyrazolidinedione-2-carboxylic acid.

6. A product as defined by claim 1 wherein the non-alkaline reacting solubilizing agent is 1,4-diphenyl-3,5-pyrazolidinedione-2-carboxylic acid dimethylamide.

7. A product as defined by claim 1 wherein the non-alkaline reacting solubilizing agent is an anilide of a 3,5-pyrazolidinedione-2-carboxylic acid.

8. A product as defined by claim 1 wherein the non-alkaline reacting solubilizing agent is a phenylcarbamic acid ester of the enol form of 1-phenyl-2-phenylcarbamyl-3,5-pyrazolidinedione.

References Cited in the file of this patent

UNITED STATES PATENTS

| 2,636,039 | Riehen | Apr. 21, 1953 |
| 2,671,748 | Crooks | Mar. 9, 1954 |
| 2,700,671 | Hafliger | Jan. 25, 1955 |

FOREIGN PATENTS

| 707,611 | Great Britain | Apr. 21, 1954 |
| 727,405 | Great Britain | Mar. 30, 1955 |

OTHER REFERENCES

Howard: Modern Drug Index, 5th ed., 1952, Drug Pub., New York, N. Y., p. 384.

Diserens: The Chem. Tech. of Dyeing and Printing, Reinhold Pub., New York, N. Y., 1948, pp. 8–21.